(12) United States Patent
Hoopes

(10) Patent No.: US 7,245,470 B2
(45) Date of Patent: Jul. 17, 2007

(54) UNSAFE VOLTAGE SHUTOFF CONTROL

(75) Inventor: Michael L. Hoopes, Novato, CA (US)

(73) Assignee: Panamax, Petaluma, CA (US)

( * ) Notice: Subject to any disclaimer, the term of this patent is extended or adjusted under 35 U.S.C. 154(b) by 268 days.

(21) Appl. No.: 10/849,452

(22) Filed: May 19, 2004

(65) Prior Publication Data

US 2005/0259373 A1    Nov. 24, 2005

(51) Int. Cl.
H02H 3/20 (2006.01)
H02H 9/04 (2006.01)
H02H 3/00 (2006.01)
H02H 7/00 (2006.01)
H02H 9/00 (2006.01)
H02H 3/22 (2006.01)

(52) U.S. Cl. .................. 361/91.1; 361/55; 361/111
(58) Field of Classification Search .............. 361/91.1, 361/55, 111
See application file for complete search history.

(56) References Cited

U.S. PATENT DOCUMENTS

| | | | |
|---|---|---|---|
| 3,369,153 A | 2/1968 | Arnold et al. | |
| 3,693,053 A | 9/1972 | Anderson | |
| 3,753,421 A | 8/1973 | Peck | |
| 4,023,071 A | 5/1977 | Fussell | |
| 4,089,032 A | 5/1978 | Dell Orfano | |
| 4,152,743 A | 5/1979 | Comstock | |
| 4,168,514 A | 9/1979 | Howell | |
| 4,210,906 A | 7/1980 | Smith et al. | |
| 4,249,224 A | 2/1981 | Baumbach | |
| 4,317,154 A | 2/1982 | Passarella | |
| 4,389,695 A | 6/1983 | Carpenter, Jr. | |
| 4,438,477 A | 3/1984 | Cawley | |
| 4,455,586 A | 6/1984 | McCartney | |
| 4,500,862 A | 2/1985 | Shedd | |
| 4,547,827 A | 10/1985 | Shedd | |
| 4,616,104 A | 10/1986 | Lindsey | |
| 4,626,057 A | 12/1986 | Knickerbocker | |
| 4,630,163 A | 12/1986 | Cooper et al. | |
| 4,642,733 A | 2/1987 | Schacht | |
| 4,677,518 A | 6/1987 | Hershfield | |
| 4,698,721 A | 10/1987 | Warren | |
| 4,739,436 A | 4/1988 | Stefani et al. | |
| 4,742,541 A | 5/1988 | Cwirzen et al. | |
| 4,743,999 A | 5/1988 | Hames | |
| 4,745,882 A | 5/1988 | Yarnall, Sr. et al. | |
| 4,760,485 A | 7/1988 | Ari et al. | |
| 4,807,083 A | 2/1989 | Austin | |
| 4,835,650 A | 5/1989 | Epstein | |
| 4,879,625 A * | 11/1989 | Potenzone | ............ 361/90 |

(Continued)

Primary Examiner—Stephen W. Jackson
Assistant Examiner—Dharti H. Patel
(74) Attorney, Agent, or Firm—Hogan & Hartson LLP

(57) ABSTRACT

A circuit and device protects connected equipment from a broad range of unsafe conditions of over-voltage and under-voltage by disconnecting the line voltage before surge protection components, generally MOVs, are damaged from sustained surges. However, nuisance tripping of the protective circuit is avoiding by discriminating surges that are properly handled by the MOVs and components in the load or protective device. Further, the devise are protected from sustained high voltage line conditions, which would ordinarily result in repeated cycling between the on and off states as the line voltages fluctuates slightly at or about the trip threshold, as the circuit has a deliberate hysteresis such that the turn on voltage is about 10 to 20 V lower than the shut off threshold.

19 Claims, 4 Drawing Sheets

U.S. PATENT DOCUMENTS

| | | |
|---|---|---|
| 4,882,647 A | 11/1989 | Collins |
| 4,903,161 A | 2/1990 | Huber et al. |
| 4,918,565 A | 4/1990 | King |
| 4,922,374 A | 5/1990 | Mueller et al. |
| 4,937,722 A | 6/1990 | Deierlein |
| 4,944,698 A | 7/1990 | Siemon et al. |
| 4,968,264 A | 11/1990 | Ruehl et al. |
| 4,996,945 A | 3/1991 | Dix |
| 5,032,946 A | 7/1991 | Misencik et al. |
| 5,089,929 A | 2/1992 | Hilland |
| 5,130,881 A | 7/1992 | Hilland |
| 5,153,806 A | 10/1992 | Corey |
| 5,177,782 A | 1/1993 | Henderson et al. |
| 5,216,569 A | 6/1993 | Brookhiser |
| 5,224,013 A | 6/1993 | Pagliuca |
| 5,278,720 A | 1/1994 | Bird |
| 5,365,395 A | 11/1994 | Callaway |
| 5,377,067 A | 12/1994 | Tanaka et al. |
| 5,388,021 A | 2/1995 | Stahl |
| 5,410,443 A | 4/1995 | Pelegris |
| 5,412,526 A | 5/1995 | Kapp et al. |
| 5,423,697 A | 6/1995 | MacGregor |
| 5,483,409 A | 1/1996 | Heidorn et al. |
| 5,488,535 A | 1/1996 | Masghati et al. |
| 5,537,044 A | 7/1996 | Stahl |
| 5,543,999 A | 8/1996 | Riley |
| 5,555,153 A | 9/1996 | Frederiksen et al. |
| 5,617,288 A | 4/1997 | Zaretsky |
| 5,691,872 A | 11/1997 | Cohen |
| 5,734,542 A | 3/1998 | Cohen |
| 5,757,603 A | 5/1998 | Kapp et al. |
| 5,768,081 A | 6/1998 | Cohen et al. |
| 5,896,265 A | 4/1999 | Glaser et al. |
| 5,914,662 A | 6/1999 | Burleigh |
| 5,978,198 A | 11/1999 | Packard et al. |
| 6,118,639 A * | 9/2000 | Goldstein .................. 361/55 |
| 6,147,304 A | 11/2000 | Doherty |
| 6,188,557 B1 | 2/2001 | Chaudhry |
| 6,226,162 B1 | 5/2001 | Kladar et al. |
| 6,226,166 B1 | 5/2001 | Gumley et al. |
| 6,229,682 B1 | 5/2001 | Mechanic |
| 6,252,754 B1 | 6/2001 | Chaudhry |
| 6,282,075 B1 | 8/2001 | Chaudhry |
| 6,385,030 B1 | 5/2002 | Beene |
| 6,414,241 B1 | 7/2002 | O'Donnell |
| 6,606,232 B1 | 8/2003 | Vo et al. |
| 6,614,636 B1 | 9/2003 | Marsh |
| 6,778,375 B1 | 8/2004 | Hoopes |
| 6,816,350 B1 * | 11/2004 | Hoopes .................. 361/90 |

* cited by examiner

UNSAFE VOLTAGE SHUTOFF CONTROL

CROSS REFERENCE TO RELATED APPLICATIONS

None

BACKGROUND OF INVENTION

The present invention relates to transient voltage surge suppressors (TVSS) for protecting electrical equipment connected to alternating current (AC) electrical power lines, and in particular, to TVSS circuits for protecting electrical loads from sustained excessive AC voltages.

Electrical power lines are often subject to surges and other transients of high current or voltage caused by various events, such as lightning, switching on or off significant electrical loads, or even occasional short circuits. Such surges or transients can cause permanent damage to electrical equipment connected to the power line, particularly equipment in which electronic devices are responsible for the consumption and use of the power. Transient voltage surge suppressors have long been used to detect and attempt to divert such surges and transients before they reach the devices connected to the power line. The TVSS industry and marketplace generally focus on the limiting of transients of short duration, such as those resulting from lightning strikes. However, additional relatively common conditions exist which can produce sustained over-voltage conditions whereby the AC voltage presented via the power lines is significantly higher than that for which the connected electrical equipment is designed and capable of operating without damage. For example, poor voltage regulation by the electrical utility provider, improper wiring of the facility, use of standby generators, or incorrect or defective bonding of neutral and ground line connections can all lead to sustained AC over-voltage.

Under such sustained over-voltage conditions, conventional TVSS devices, which use voltage-limiting components (e.g., metal oxide varistors or "MOV"s) to limit transients of short duration, will either be ineffective (if their limiting, or "let-through," voltage is more than the peak value of the power line voltage) or simply burn out, since MOV voltage limiters overheat in a very short time when absorbing the excessive power associated with the over-voltage.

It is therefore a first object of the present invention to provide an over-voltage protection circuit that disconnects a surge suppressor circuit and the load from the power source before the surge suppressor components are damaged, and then restores the load when the over-voltage conditions is abated.

Another object is to provide an under voltage protection circuit that disconnects a surge suppressor circuit and the load from the power source before the critical components in the device that constitutes the load are damaged, and then restores power to the load when the under-voltage conditions is abated.

Another object is to provide a variable voltage/time response, which varies in proportional to propensity for the condition to damage a MOV or other surge suppressor components, wherein the threshold for disconnecting the power from the surge suppressor circuit and load varies with the total energy in the voltage transient.

It is another objective to also disconnect the load and surge protector components under more sustained over voltage conditions, which would result in damage to the MOV, and/or require a thermal fuse coupled to the MOV.

Yet a further object is to provide a combined over and under voltage protection circuit, with the over voltage protection circuit having the aforementioned variable voltage/time response.

An additional object is to provide an over voltage protection circuit of the aforementioned character that precludes cycling of the disconnection circuit between the open and closed state at or near the trip threshold.

SUMMARY OF INVENTION

The invention is for an improved TVSS device which includes circuitry to detect such over-voltage conditions and cause a switch, such as a relay, to disconnect the load (as well as the MOV circuitry) from the power line when there is a sustained over-voltage condition between the power and neutral voltage lines.

An unsafe voltage protection circuit of the TVSS, in accordance with the present invention, monitors at least the line-neutral inter-terminal voltage for an over-voltage condition. If the inter-terminal voltage exceeds a predetermined maximum voltage, even for a short time interval, the incoming power line connection is interrupted to protect the load circuitry (as well as any other additional circuitry, such as transient suppression circuitry using MOV devices) from exposure to such excessive voltage. This power interruption is maintained for so long as such over-voltage condition exists.

Additionally, in a preferred embodiment the line to neutral inter-terminal voltages is further monitored by the unsafe voltage protection circuit for under-voltage conditions, whereby the load can be protected from exposure to low voltage (e.g., "brownout") conditions.

In the case of an over-voltage condition, the response time varies to avoid nuisance trips caused by lower voltage surges of very short duration that would not damage the other protection circuitry component or the protected equipment. The trip time takes into account the conductive threshold and damage characteristics of MOV or comparable components.

Further, in or to avoid nuisance cycling of the protection circuit when the over-voltage condition hovers at about the trip threshold, the device provides for a lower turn on threshold after trip.

The above and other objects, effects, features, and advantages of the present invention will become more apparent from the following description of the embodiments thereof taken in conjunction with the accompanying drawings.

DETAILED DESCRIPTION

Figure 1:
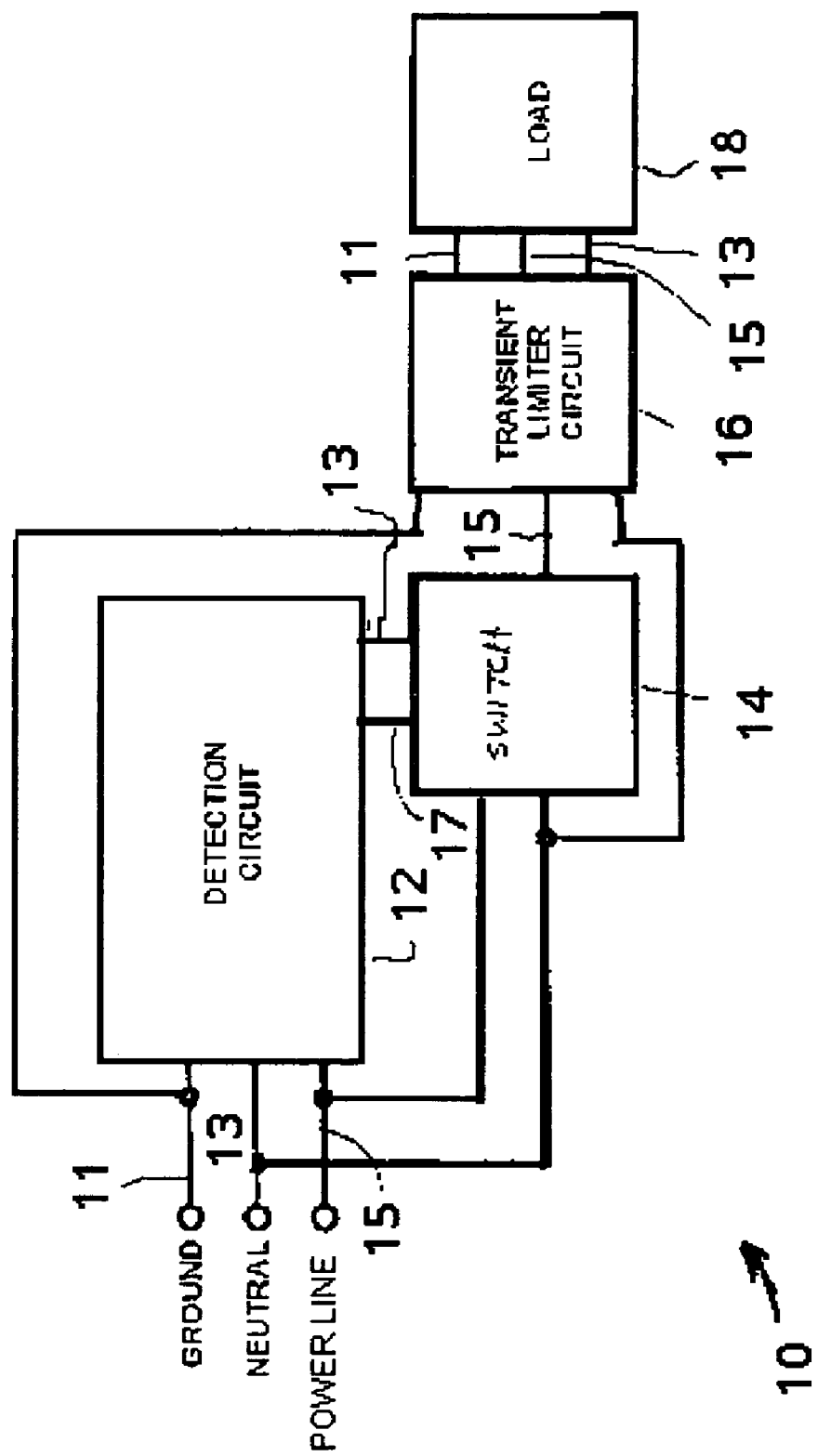
FIG. 1 is a functional block diagram of an over-voltage protection circuit for protecting an electrical load in accordance with one embodiment of the present invention.

Referring to FIG. 1, an unsafe voltage protection circuit 10 for protecting a load 18 against sustained under-voltage or over-voltage conditions includes a voltage detection circuit 12, a switch 14 and a transient limiter circuit 16, all interconnected substantially as shown (and discussed in more detail below). The ground 11, neutral 13 and power 15 lines connect to the voltage detection circuit 12, switch 14 and transient limiter circuit 16. The voltage detection circuit 12 is, in the broadest embodiments, capable of monitoring the inter-terminal voltages between any two of the combination of the ground 11, neutral 13 and power 15 lines, but will be described with respect to the protection for unsafe voltage conditions detected by the inter-terminal voltage between ground and line.

In one embodiment, whenever the voltage between the line terminal and the neutral terminal exceeds a predetermined maximum voltage, the voltage detection circuit 12, via control 17, instructs the switch (e.g. relay) to interrupt the current path of the incoming power line 15 to the transient limiter circuit 16 and load 18, thereby preventing the excessive voltage appearing on the power line 15 from reaching the transient limiter circuit 16 and load 18. Additionally, the voltage detection circuit 12 may detect when the voltage between the neutral 13 and power 15 lines falls below a predetermined minimum voltage whereupon the switch 14 is instructed to disconnect the incoming power line 15 from the transient limiter circuit 16 and load 18, thereby preventing damage that can be caused by an under-voltage condition. It should be appreciated that other variants of the circuit permit the monitoring of anyone or more of such inter-terminal voltages between ground, line and neutral terminal, and the interruption of the current in response to an unsafe over or under-voltage condition there between.

Figure 2:
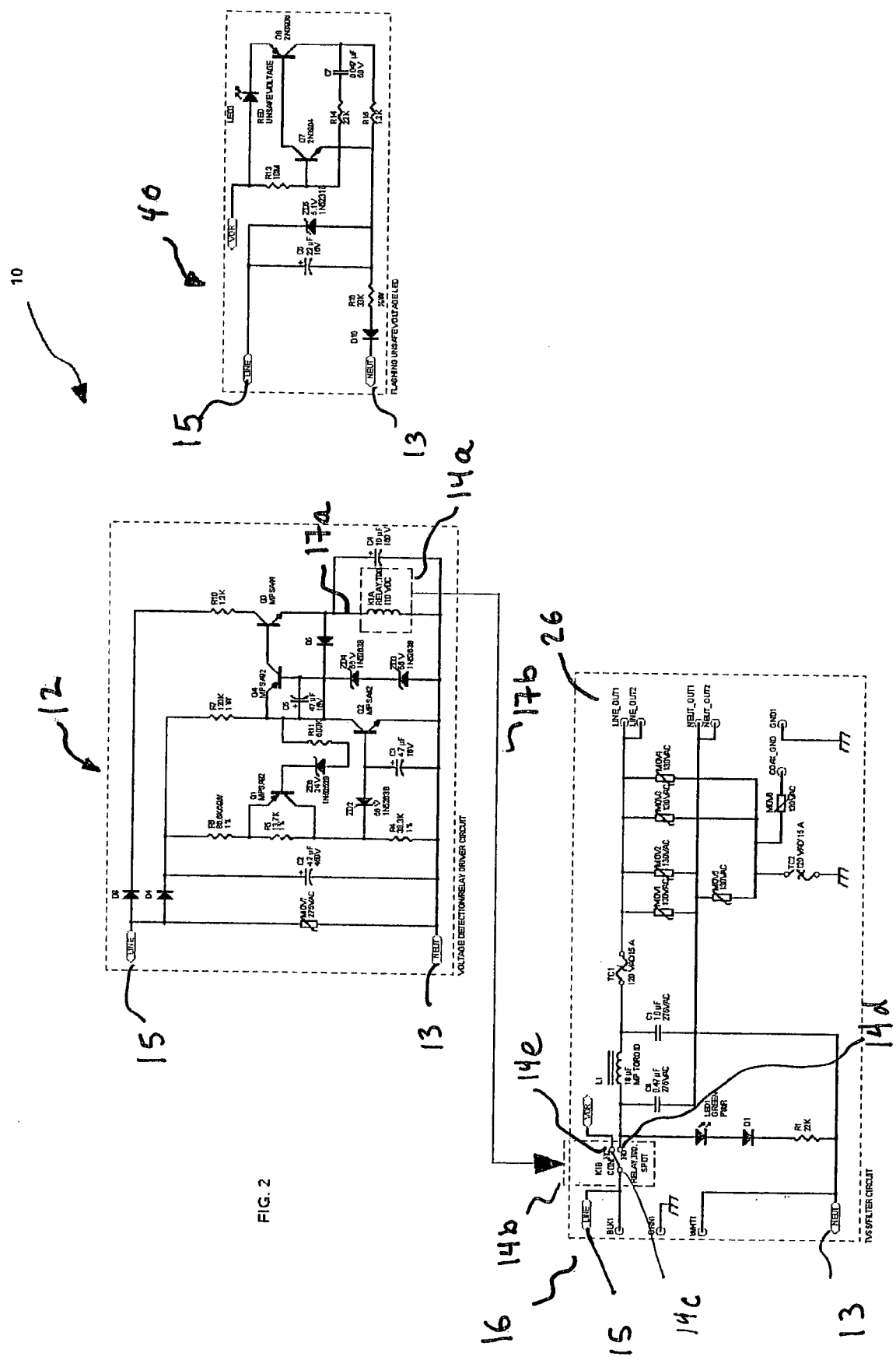
FIG. 2 is an electrical schematic diagram of a first embodiment of the voltage protection circuit of FIG. 1.

Referring to FIG. 2, a specific implementation of the unsafe voltage protection circuit 12 of FIG. 1 will be described first in the normal state of operation, when the inter-terminal voltage is within the range of the under-voltage and over-voltage trip or protection thresholds. Voltage detection circuit 12 provides a peak detector function operative with respect to the relay driver/controller function, by measuring the peak AC line voltage as a DC value, and compares it against a reference voltage using a voltage divider/zener-diode-comparator. The transient limiter circuit 16 (also labeled as TVSS/Filter Circuit) only receives power when a relay or other switch connected to the line input power is closed in response to the outcome of the voltage divider/zener-diode-comparator result. The relay driver/controller function is fault-tolerant with respect to the shutoff mechanism, as should either of two relay controller switches (Q2, Q3) fail, the other one will handle the shutoff function. It also uses semi-isolated DC supplies via rectifier diodes D4 and D9 for the peak detector and relay driver (filtered to DC by C2 and C4, respectively). As described in further detail below, the relay driver supply is voltage-regulated by the series zener diodes ZD3 and ZD4 to the nominal operating voltage of relay K1A 14. Thus, the circuit can be modified to adjust the different shutoff thresholds and relay configurations as suits the application.

The relay driver portion of circuit 12, is formed by transistors Q2, Q3 and Q4, and is powered by half-wave rectified AC voltage to charge up capacitor C4 to a DC voltage regulated by ZD3 and ZD4. Two series zener diodes are shown here, but a single part of sufficient value (up to the maximum safe operating voltage of the diode) can be used as well. R10 is used as a current-limiting device to protect Q3 from transient overloads. R7, which supplies base current to Q3, is connected to the detector portion of the circuit to supply DC power via rectifying diode D4. If detector components C1 or D4 fail, the relay(s) 14a will shut off.

Thus, relay K1A 14 constitutes the controlled portion of switch 14 in FIG. 1. Diode D9 half-wave rectifies AC power from the line connection 15 to charge capacitor C4. The DC voltage of C4 is regulated by zener diodes ZD3 and ZD4. Two series zener diodes are deployed in this embodiment, but a single part of sufficient value (up to the maximum safe operating voltage of relay coil in K1A 14) can be used as well. The supply of rectified power to C4 and relay coil 14a closes switch 14 such that current is supplied to the transient limiter circuit 16 and the load 18. It should be appreciated that two switching poles, possibly actuated by two separate relay coils or other driving mechanism, can be used in parallel, depending on the needs of the application. In operation, diode D4 half-wave rectifies AC power from the line connection 15 to charge capacitor C2. To the extent the AC power exceed the threshold clamping value of MOV7, the excess power in the voltage surge is shunted to neutral, protecting the components in detection circuit 12, as well as transient limiter circuit 16 and load 18. It should be appreciated that MOV7 has a higher switching threshold than the MOVs in the transient voltage surge suppression (TVSS)/filter circuit 16, being rated at about 275 VAC. C2 powers the combination of transistors Q2, Q4 and Q1 that constitute the relay driver/controller function of detection circuit 12.

However, the preferred switching thresholds and the voltage dependent switch time can be expected to vary depending on the nature of the load, or protected circuit, and the surge suppressor components, as the principles of operation are applicable to protecting components that are energized by applications inclusive of three-phase 208, single-phase 240 and 120, and the like.

The half-wave-rectified AC line voltage, provided by the connection of the line terminal to D9, is filtered to DC by C2. After filtering, it is compared to a reference voltage set by ZD2 using a voltage divider to correlate the shutoff threshold. When the peak voltage, exceeds the shutoff threshold, determined by voltage across R4, as divided with respect to the value of R5 plus R6, ZD2 will begin to conduct, forward-biasing Q2 and turning it "on". Q2 creates a "crowbar" to the power supply ground (neutral) and quickly discharges the relay coil(s) and the relay driver storage capacitor C4 through D5, causing the relay(s) to shut off. Simultaneously, Q3 becomes reverse-biased and cuts off the relay driver supply source. Depending on the conditions necessary to turn on Q1, as further discussed below, the relay 14a will turn on again once the peak AC voltage drops by predetermined level below the shutoff threshold.

However, in the normal state of operation, transistor Q2 is in an off state, the incoming power line voltage, rectified by diode D9 and filtered by capacitor C2, causes zener diodes ZD3 and ZD4 to become conductive (since their thresholds, or breakdown, voltage is exceeded by the rectified incoming power line voltage) and transistor Q4 to turn on. This causes a base current for transistor Q3 to be produced (limited by resistor R7), thereby causing transistor Q3 to turn on and provide a drive current 17a for the input coil 14a of the relay K1a 14. (No current diversion takes place through diode D5 since transistor Q2 is turned off.) As a result, in accordance with well known relay operation, the magnetic energy 17b produced by the relay coil 14a causes the relay pole 14c of the relay output 14b to be connected to relay throw 14d, thereby providing a current path for electrical current from the power line connection 15 to the output switch 26.

With output power thus available, current also flows to light emitting diode LED 1 and diode D1, being limited by resistor R1. This lighting of diode LED 1 indicates a proper power connection to the output switch, and the provision of surge protected power at line, neutral and ground output terminals 1 and 2 of TVSS/Filter Circuit 16, where one or more loads 18 of FIG. 1 is connected In the TVSS/Filter Circuit 16 over-voltage protection for the inter-terminal voltages between the ground 11, neutral 13 and power line 15 connections is provided by way of multiple varistors MOV1, MOV2, MOV3, MOV4, MOV5, MOV6. Additionally, fuses TC1 and TC2 provide backup protection against burning up varistors MOV2, MOV3, MOV5 and MOV6. It should be noted that in this embodiment TC1 thermally couples with MOV1–4, and TC2 with MOV5–6, such that overheating of the MOV trips the coupled fuse.

Further, it should be appreciated that on supplying power to device 10 at the line, ground and neutral terminal of the TVSS/Filter Circuit 16, the voltage detection circuit 12 is energized and functioning before power is supplied to the line, neutral and output terminals, as capacitor C4 must be fully charged before the switch 14b of relay 14 is able to close.

When the rectified voltage between the cathode of D4 and the neutral terminal exceeds a threshold value that exceed the breakdown threshold of ZD2 current is potentially available for supply to the base of Q2. However, the speed at which Q2 opens is moderated by capacitor C3. This causes base current to become available for transistor Q2, thereby turning transistor Q2 on in a saturated state. The emitter terminal of transistor Q4 and cathode of diode D9 thus become effectively shorted to the neutral line 13. As a result, transistor Q4 and zener diode ZD4 are turned off, thereby preventing the flow of base current to transistor Q3. Transistor Q3 then turns off, thereby eliminating the drive current for the relay coil 14a. With transistor Q2 and diode D9 both turned on, the charge stored in capacitor C4 is quickly depleted, thereby causing the relay coil 14a to become quickly deactivated.

With the elimination of the drive current for the relay coil 14a and depletion of charge across capacitor C4 (and, therefore, the collapse of the magnetic field 17b), the relay pole 14c becomes connected to relay throw 14e, thereby interrupting the current path between the power line connection 15 and the line output terminals 26. Instead, current now flows to the flashing unsafe voltage LED circuit 40 that is operative to intermittently turn LED3 on and off. This lighting of diode LED3 indicates the interruption of output power due to the unsafe voltage condition.

Another condition, which this circuit 10 protects against, is an under-voltage condition between the neutral 13 and power 15 lines. During such a condition, the inter-terminal voltage between the neutral 13 and power 15 lines is insufficient to cause zener diodes ZD3 and ZD4 to go into zener breakdown, thereby preventing diode ZD4 and transistor Q4 from turning on. In turn, this prevents transistor Q3 from receiving a base current. As a result, transistor Q3 is turned off and no current is available to drive the relay coil 14a and generate a magnetic field 17b to cause the relay output 14b to connect pole 14c to throw 14d. Instead, the relay pole 14c remains connected to relay throw 14e, thereby interrupting the current path between the power line 15 and line output terminal 26, and powering the flashing of unsafe voltage LED3 circuit 40 which is operative to intermittently turn LED3 on and off, This lighting of diode LED3 indicates the interruption of output power due to the unsafe voltage condition.

It should be understood that providing both an over and under-voltage protection function to detection circuit 12, while being a preferred embodiment, is not intended to be limiting as the over and under protection sub-circuit components need not be deployed together Further, an "instantaneous" shutoff is not always needed to protect components or equipment from mild to moderate over-voltages, and can result in an excessive number of "nuisance trips", which can be quite disruptive to users of information technology (IT) and home theater systems. Generally, potential damage to voltage-limited components can be correlated with the following power event parameters: voltage, duration, and available current. A response delay can be utilized that is voltage dependent: longer (up to 3 seconds) for mild over voltages, decreasing at around 150% of nominal input voltage to an asymptote (controlled solely by the sum of the detector time response and relay contact "crowbar" release time) which should be less than 25 milliseconds. The placement of capacitors C3 and C5 across the base-emitted junctions of Q2 and Q4 achieves this objective as the switching of these transistors will have an added time response directly proportional to the dv/dt across. It should be further appreciated that this circuit is designed to respond to an over-voltage condition more rapidly than to an under-voltage condition. In the event of an over-voltage condition, as discussed above, not only is the drive current to the relay coil 14a from transistor Q3 terminated, but the existing charge across capacitor C4 is also quickly depleted via transistor Q2 and diode D5. This causes the relay coil 14a to deactivate quickly. In the event of an under-voltage condition, however, the drive current to the relay coil 14a from transistor Q3 is interrupted, but the existing charge across capacitor C4 is allowed to be depleted more slowly through the windings of the relay coil 14a. This causes the relay coil 14a to deactivate more slowly.

Figure 3:
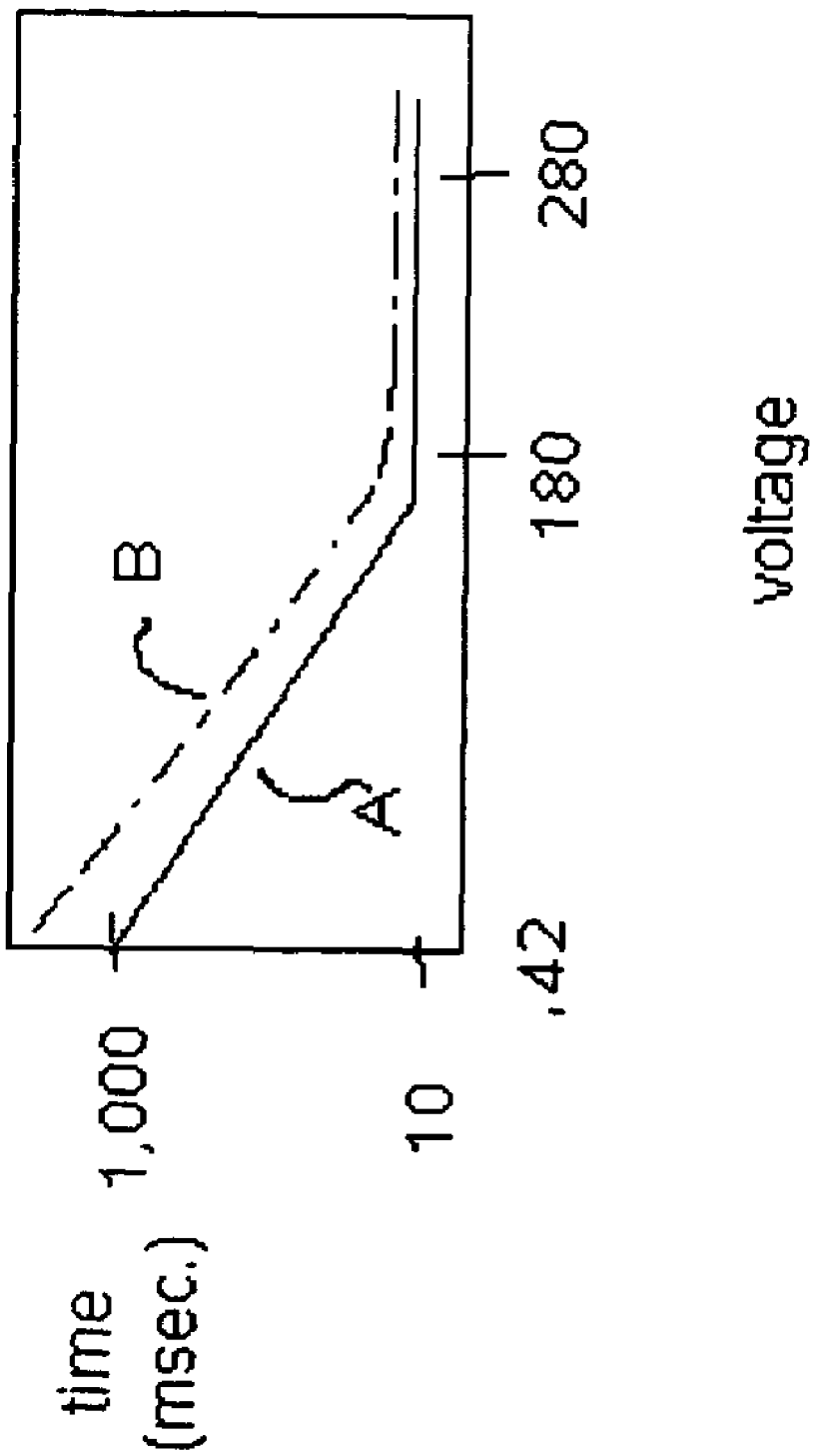
FIG. 3 is a schematic diagram illustrating the time response characteristics of the detection circuit of FIG. 2.

FIG. 3 illustrates the result of the optimal selection of C3 in the detection circuit to control the rate of shut off in over voltage conditions for the circuit 12 of FIG. 2. The applied voltage is plotted on the ordinate axis whereas the desired shot-off time, as a function of applied voltage is plotted as curve A. thus, at the lowest shut off voltage threshold of the circuit, 142 VAC the circuit responds to a sustained pulse of 1,000 msec. (1 sec.), however as the peak voltage is broader, that is up to about 180 VAC, it is desirable that the tripping pulse duration decrease proportionally in length, that is to about a single AC half cycle at 60 Hz., or about 8 msec., with the trip voltage duration being the same or lower for surges having a peak voltage over about 180 to about 240 VAC. Such a voltage dependent trip time response avoids, nuisance trips, which would not damage equipment, yet protects MOV in the primary surge protection circuit from being damaged or heated by constant voltage below their nominal breakdown threshold. This further illustrated by a conception damage rating curve for an MOV in the curve labeled "B", which is offset above the circuit characteristic response curve, "A", such that the circuit always disconnects the MOV faster than the minimum time or pulse duration that causes damage.

Thus, when the detection circuit 12 in FIG. 2 disconnects the line voltage from a high voltage condition, it is desirable that power is not restored until the line voltage drops to a significant value below the trip voltage, termed the "recovery" voltage. If the recovery voltage is only within 1 to 2 volts of the trip voltage the disconnect circuit 18 and devices or powered equipment that constitutes the load 18, can cycle between the on and off states when the over-voltage condition hovers about the trip voltage. Accordingly, another aspect of the invention is an increased level of hysterisis wherein the line voltage decreases by a predetermined amount, about 5 volts below the trip voltage in this embodiment, before the power is restored.

In detection circuit 12, absent components Q1, ZD6 and R11 detection circuit 12 has a "recovery" voltage threshold that is only 1–2 volts lower than the shutoff voltage threshold. This means that for power events where line voltage may be fluctuating more than two volts in the vicinity of the shutoff threshold, the shutoff circuit may be actuated multiple times in a short period of time. As this is not desirable, R5 is intended to be selectively bypassed or shunted in the circuit such that "recovery" voltage is decreased to a more comfortable level. As will be further explained, R5 can be inserted into the voltage divider and controlled using a feedback loop provided by Q1, R11 and ZD7. When the voltage detector is below the shutoff threshold (and the relays are on), Q1 is in cutoff and R5 is part of the voltage divider. When the shutoff threshold is reached, Q2 begins to go into saturation and turns Q1 on, bypassing R5. Decreasing the effective shutoff threshold, via the selection of the ratio of R6 and R5, provides a level of hysteresis that is needed to achieve the desired "noise immunity"

Under normal, that is safe operation, when relay K1A 14 is powered, Q1 is normally in the off, or open circuit state open, Q4 is open such that current flows through both R6 and R5. Thus, the turn-off or trip threshold voltage of the circuit is determined by R5 and R6 in comparison to R4, which divide the voltage differential necessary to exceed the breakdown threshold of ZD2, and thereby turn on Q2. However once Q1 turns on, via the when Q4 turns off such that the zener breakdown threshold for ZD6 is now exceed, the voltage shifts as the voltage divider is now determined by R4 and R6, as R5 is effectively shunted as current flows to R4 via Q1. Hence to re-energize the detection circuit, the voltage at ZD2 must drop to a lower value before Q2 will turn off. Thus, the voltage divider portion of circuit 12 is controlled by operation of the feedback loop provided by Q1, R 11 and ZD6. Accordingly, zener diode ZD6 is selected for a breakdown threshold value sufficient to energize the base of Q1 when the trip condition occurs. Thus, in the circuit of FIG. 2, the illustrated values for R6, R5 and R4 result in a trip voltage of about 198 VDC with a turn on voltage of about 176 VDC, or a difference of about 22 VDC.

Figure 4B:
FIGS. 4A, 4B, 4C illustrate power semiconductor devices that may be used as substitutes in place of the electromechanical relay in the circuit of FIG. 2.
Figure 4C:
Figure 4A:

Referring to FIGS. 4A and 4B in regard to the switch 14 used, as will be readily understood and appreciated by one of ordinary skill in the art, depending upon load current requirements, it is possible to substitute the use of a power semiconductor device in place of an electromechanical relay. Suitable examples would include a thyristor device, such as a silicon controlled rectifier (SCR) 114a (FIG. 4A) or triac 114b (FIG. 4B), or a power metal oxide semiconductor field effect transistor (MOSFET) 114c (FIG. 4C). If so, the drive current 17a provided by transistor Q3 (converted to a voltage as necessary) or control signal 17c, operative on the detection or production of an unsafe voltage conditions, would control the gate terminal of the SCR 114a, triac 114b or MOSFET 114c in accordance with well-known conventional techniques.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

The invention claimed is:

1. An apparatus including an unsafe voltage protection circuit for protecting against excessive voltages between a power line and a neutral line, including:
    a) a power line terminal that provides for a power line connection;
    b) a neutral line terminal that provides for a neutral line connection;
    c) a ground line terminal that provides for a ground line connection;
    d) a load terminal that provides for a load circuit connection;
    e) a voltage detection circuit, coupled between said power and neutral line terminals, that monitors inter-terminal voltages between said power and neutral terminals; and
    f) a switch circuit, operatively coupled to said voltage detection circuit and between said power line and load terminals, that
    i) provides an electrical current path between said power line and load terminals when said voltage detection circuit detects that the inter-terminal voltages is less than a predetermined maximum voltage and greater than a first predetermined minimum voltage,
    ii) interrupts said electrical current path when said voltage detection circuit detects that the inter-terminal voltages is greater than said predetermined maximum voltage or less than the first predetermined minimum voltage, and
    iii) restores said electrical current path, after interruption thereof when said voltage detection circuit detects that the inter-terminal voltages is less than a second predetermined minimum voltage intermediate between said predetermined maximum voltage and said first predetermined minimum voltage.

2. An apparatus according to claim 1 wherein the difference between said predetermined maximum voltage and said second predetermined minimum voltage is at least about 5 volts.

3. An apparatus according to claim 1 wherein the difference between said predetermined maximum voltage and said second predetermined minimum voltage is at least about 20V.

4. The apparatus of claim 1, wherein said voltage detection circuit comprises means for voltage threshold detection.

5. The apparatus of claim 1, wherein said switch circuit comprises a relay.

6. The apparatus of claim 1, wherein said switch circuit comprises a power semiconductor device.

7. The apparatus of claim 1 further comprising at least one surge arrester disposed between said switch circuit and said load terminal connected to said ground line terminal.

8. The apparatus of claim 7 wherein said surge arrester is a metal oxide varistor.

9. An apparatus including an over-voltage protection circuit for protecting against excessive voltages between a power line and a neutral line, including:
    a) a power line terminal that provides for a power line connection;
    b) a neutral line terminal that provides for a neutral line connection;
    c) a ground line terminal that provides for a ground line connection;
    d) a load terminal that provides for a load circuit connection;

e) a voltage detection circuit, coupled between said power, neutral and ground line terminals, that monitors inter-terminal voltages between said power and neutral terminals; and f) a switch circuit, operatively coupled to said voltage detection circuit and between said power line and load terminals, that i) provides an electrical current path between said power line and load terminals when said voltage detection circuit detects that the inter-terminal voltages is less than a predetermined first maximum voltage and greater than a predetermined minimum voltage, ii) interrupts said electrical current path when said voltage detection circuit detects that the inter-terminal voltages is greater than said first predetermined maximum voltage for a duration of about 1,000 msec and iii) immediately interrupts said electrical current path when said voltage detection circuit detects that the inter-terminal voltages is greater than a second maximum voltage, said second maximum voltage being greater than the first predetermined maximum voltage.

10. An apparatus according to claim 9 wherein said switch circuit is operative to interrupt said electrical current path when said voltage detection circuit detects that the inter-terminal voltages is greater than said first maximum voltage and less than said second maximum voltage for a predetermined time that decreases in proportion to the difference between the detected voltage and the second maximum voltage.

11. An apparatus according to claim 9 wherein the first predetermined maximum voltage is about 140 volts and the second maximum voltage is about 180 volts.

12. The apparatus of claim 8, wherein said voltage detection circuit comprises a voltage threshold detection circuit with an associated threshold voltage corresponding to said predetermined maximum voltage.

13. An apparatus including an over-voltage protection circuit for protecting against excessive voltages between two or more of a power line, neutral line and ground line, including:

a) a power line terminal that provides for a power line connection;

b) a neutral line terminal that provides for a neutral line connection;

c) a ground line terminal that provides for a ground line connection;

d) a load terminal that provides for a load circuit connection;

e) a voltage detection circuit, coupled between said power, neutral and ground line terminals, that monitors inter-terminal voltages between said power and neutral terminals; and f) a switch circuit, operatively coupled to said voltage detection circuit and between said power line and load terminals, that i) provides an electrical current path between said power line and load terminals when said voltage detection circuit detects that the inter-terminal voltages is less than a first predetermined maximum voltage and greater than a first a predetermined minimum voltage, ii) interrupts said electrical current path when said voltage detection circuit detects that the inter-terminal voltages is greater than said first predetermined maximum voltage for a duration of about 1,000 msec., and iii) restores said electrical current path, after interruption thereof, when said voltage detection circuit detects that the inter-terminal voltage is less than a second predetermined minimum voltage intermediate between said first predetermined maximum voltage and said first predetermined minimum voltage.

14. The apparatus of claim 13, wherein said switch circuit is operative to immediately interrupt said electrical current path when said voltage detection circuit detects that the inter-terminal voltages is greater than a second maximum voltage, said second maximum voltage being greater than the first maximum voltage.

15. An apparatus according to claim 14 wherein said switch circuit is operative to interrupt said electrical current path when said voltage detection circuit detects that the inter-terminal voltages is greater than said first maximum voltage and less than said second maximum voltage for a predetermined time that decreases in proportion to the difference between the detected voltage and the second maximum voltage.

16. An apparatus according to claim 9 wherein the first predetermined maximum voltage is about 140 volts and the second maximum voltage is about 180 volts.

17. The apparatus of claim 13, wherein said switch circuit comprises a relay.

18. The apparatus of claim 13, wherein said switch circuit comprises a power semiconductor device.

19. The apparatus of claim 13 further comprising at least one surge arrester disposed between said switch circuit and said load terminal connected to said ground line terminal.

* * * * *